United States Patent
McAvoy (10) Patent No.: US 7,925,875 B2
(45) Date of Patent: *Apr. 12, 2011

(54) SYSTEMS AND METHODS FOR IDENTIFYING AND BOOTING A COMPUTER ARCHITECTURE

(75) Inventor: Paul McAvoy, San Francisco, CA (US)

(73) Assignee: SanDisk Corporation, Milpitas, CA (US)

( * ) Notice: Subject to any disclaimer, the term of this patent is extended or adjusted under 35 U.S.C. 154(b) by 400 days.

This patent is subject to a terminal disclaimer.

(21) Appl. No.: 11/618,872

(22) Filed: Dec. 31, 2006

(65) Prior Publication Data

US 2008/0162917 A1    Jul. 3, 2008

(51) Int. Cl.
  *G06F 9/00*  (2006.01)
  *G06F 15/177*  (2006.01)

(52) U.S. Cl. ................................................. 713/2

(58) Field of Classification Search ............... 713/2
  See application file for complete search history.

(56) References Cited

U.S. PATENT DOCUMENTS

| | | | |
|---|---|---|---|
| 6,032,255 | A | 2/2000 | Shim et al. |
| 6,646,546 | B1 * | 11/2003 | Butler et al. ............... 370/276 |
| 7,293,166 | B2 | 11/2007 | Nguyen et al. |
| 7,536,462 | B2 * | 5/2009 | Pandya ........................ 709/227 |
| 2004/0068645 | A1 | 4/2004 | Larvoire |
| 2004/0236997 | A1 | 11/2004 | Poo |
| 2005/0060531 | A1 * | 3/2005 | Davis et al. ..................... 713/2 |
| 2005/0193189 | A1 | 9/2005 | Kim |
| 2006/0026338 | A1 * | 2/2006 | Ebara et al. ................. 711/103 |
| 2006/0143432 | A1 | 6/2006 | Rothman et al. |
| 2006/0195836 | A1 | 8/2006 | Lu et al. |
| 2007/0028124 | A1 * | 2/2007 | Resnick et al. ............. 713/300 |
| 2007/0033322 | A1 * | 2/2007 | Zimmer et al. ............. 711/103 |
| 2007/0180445 | A1 | 8/2007 | Greeff |
| 2008/0162916 | A1 | 7/2008 | McAvoy |

FOREIGN PATENT DOCUMENTS

KR    10-2005-0119569    12/2005

OTHER PUBLICATIONS

International Search Report mailed Apr. 17, 2008 for International Application No. PCT/US2007/089050.
Written Opinion of the International Searching Authority mailed on Apr. 17, 2008 for International Application No. PCT/US2007/089050.
Office Action issued in U.S. Appl. No. 11/618,870 on May 27, 2009, 9 pages.
Office Action issued in U.S. Appl. No. 11/618,870 on Dec. 22, 2009, 11 pages.

* cited by examiner

*Primary Examiner* — Thomas Lee
*Assistant Examiner* — Mohammed H Rehman
(74) *Attorney, Agent, or Firm* — Brinks Hofer Gilson & Lione (57) ABSTRACT

Methods, systems, and architectures for multiplatform booting from a portable module with nonvolatile memory. Preferably the portable module carries the correct binaries for booting multiple system architectures, together with a table from which the host, at power-up, can calculate the correct offset to load the appropriate binary.

24 Claims, 6 Drawing Sheets

Table 1

Architecture Codes

| ID | ARCHITECTURE DESCRIPTION |
|---|---|
| 0x00 | Unspecified Architecture |
| 0xF4 | Unspecified Architecture - x86 HLT instruction |
| 0x01 | IA32 (32 bit x86) architecture code |
| 0x02 | IA64 (64 bit x86) |
| 0x03 | ARM - little endian |
| 0x04 | ARM - big endian |
| 0x05 | M68K - Motorola 6800 architecture |
| 0x06 | MIPS |
| 0x07 | MIPS 64 |
| 0x08 | SPARC |
| 0x09 | SPARC 64 |
| 0x0A | PPC |
| 0x0B | PPC 64 |
|  | Other architecture types as defined by, for example, SD Architecture. |

*FIG. 2*

Table 2

Boot Table Configuration

| LBA | Offset | LEN | Data | Description |
|---|---|---|---|---|
| 0 | 0x3E | 1 | 0xF4 | Intel x86 HLT (halt) instruction |
| 0 | 0x3F | 7 | 0x00 | Null data |
| 0 | 0x46 | 1 | 0x01 | IA32 architecture code |
| 0 | 0x48 | 4 | 0x0000079C | Location of file data where boot code is located |
| 0 | 0x4C | 2 | 0x0001 | Boot code is 1 block (512 bytes long) |
| 0 | 0x4E | 1 | 0x04 | ARM (big-endian) code |
| 0 | 0x50 | 4 | 0x000007A0 | Location of boot code file data |
| 0 | 0x54 | 2 | 0x0100 | Boot code is 256 blocks long |
| 0 | 0x56 | 1 | 0x0A | PPC architecture code |
| 0 | 0x58 | 4 | 0x000008A0 | Location of PPC boot code data |
| 0 | 0x5C | 2 | 0x0002 | PPC boot code is 2 blocks long |
| 0 | 0x5E | .. | .. | ...other boot configuration information... |
| 0 | .. | 8 | 0x00 | End of configuration table |

Table 3

Boot Code Location

| LBA | LEN | Data | Description |
|---|---|---|---|
| 0x79c | 0x0001 | .. | IA32 based boot code |
| 0x7A0 | 0x0100 | .. | ARM (big-endian) boot code |
| 0x8A0 | 0x0002 | .. | PPC boot code |
| .. | .. | .. | |

SYSTEMS AND METHODS FOR IDENTIFYING AND BOOTING A COMPUTER ARCHITECTURE

BACKGROUND AND SUMMARY OF THE INVENTIONS

The present application relates generally to the field of computer systems, and more particularly to a system and method for multi-architecture bootstrapping from a removable storage device.

In order to mediate between application programs and the underlying hardware, several layers of software and firmware structure are used. When power is first applied to a computer, the various hardware elements (chips and subsystems) will each have their own internal procedures (reset procedures) to regain a stable and known state. However, at some point (if the hardware is intact), these reset procedures will have ended, and at this point the CPU performs various important overhead tasks. These include, for example, surveying the system configuration, performing sanity checks on system hardware, and permitting the user to branch into an NVRAM configuration program under software control. This phase of operation is generally referred to as "POST" (Power-On-Self-Test).

After POST, a "bootstrap" (or "boot") program is automatically launched, to permit the CPU to begin execution of other software. The boot program uses data from the master boot record, which in a PC architecture is normally stored in sector 1 (a 512-byte area) of the drive where boot files are located. While executing, the master boot record loads the initial system files from disk into memory. After all operating system files have been loaded, the bootstrap program launches the operating system. The bootstrap program launches the CPU on execution of the primary operating system software; depending on how the system has been set up, the boot software may direct program execution into Vista, OS/X, Unix, or another operating system. This is normally automatic and predetermined, but is manually user-selectable in some systems. At this point the bootstrap program's job is over. The operating system then performs whatever initialization steps it has been configured for, and eventually the computer becomes available for the user to launch whatever applications are desired.

The above description refers to the world of computers, but many low-power portable electronics systems present similar issues. As such systems become more common and more versatile, their architecture has some tendency to become more diverse. (The demands of very low power consumption and customized I/O tend to produce diversity.) Many of these devices have processor and/or memory specifications comparable to a personal computer of a decade or so previously, and some have much more. Many of these portable electronics designs are designed around one primary application, with other features added on. For example, PDA (personal digital assistant) phone designs may show some differences in design, depending on whether the product (or company) is based in phones or in PDAs. The combination of expensive compute power and battery energy is a powerful force for functional convergence, but many portable electronics market segments still show signs of their more specific origins. Various complex portable electronics functions include game machines, telephones, music and movie players, cameras and video recorders, PDAs, position sensing, cardiac monitors, hybrids of these, and possibly also such newer functions as image-understanding security monitors, face recognition software, and collision avoidance. Thus an extreme diversity of hardware will continue for the near future at least, even while the potential for convergence in creases.

Many developments in portable electronics have been driven by content ownership. Music, videos, and games are frequently pirated, and the gap between the unit price paid by conscientious buyers and the average unit price received by copyright owners is a tax on development. Thus, extreme efforts have been made to develop nonvolatile memory modules which would be impossible to subvert. Advanced memory modules, such as those marketed by SanDisk, commonly contain a processor which can execute cryptographic algorithms invisibly to the host machine, so that the protected content cannot be accessed directly.

Even greater security could be provided by a controlled software environment in the host. This is not easily achieved by a program in a nonvolatile memory module, but could be achieved if the system is booted from the nonvolatile memory module. In this case the boot program can restrict loading of nonstandard operating system components, and/or load monitor processes in addition to the standard operating system components.

The first personal computers would boot from a removable disk (floppy disk), but attempts have also been made to permit booting from a nonvolatile memory module. See U.S. application Ser. No. 07/901,645, which is hereby incorporated by reference.

Multi-platform booting is an even more difficult problem. A bootstrap program has to know what files must be loaded into memory before launching the operating system, and will usually also have to know about constraints on file sequencing and memory locations. This varies widely depending on operating system and hardware environment. For example, as of 2006 an SD card can be inserted into a wide variety of systems, but a significant portion of those systems will not execute IA32 instructions. ARM and PowerPC systems are just two alternative architectures in wide use which are not IA32 compatible. Bootstrap type behavior on these systems cannot be achieved unless compatible binary files are provided for those platforms.

U.S. Pat. No. 5,291,585, which is hereby incorporated by reference, describes a personal computer with BIOS extensions. These BIOS extensions are indexed by a self-describing feature table, which is also stored in the BIOS extension.

Portable Multi-Platform Booting Systems and Architectures

The present application discloses new approaches to multi-platform booting from a portable storage module. The portable module carries a table (or other data structure) which redirect various architectures and operating systems to different locations, within the portable module, to access the appropriate binary files for booting.

For full booting compatibility, the system's boot code preferably knows to look at the module's table, and branch appropriately. However, even if full booting compatibility is not achieved in all architectures, the disclosed embodiments can also help prevent boot incompatibility, i.e. hanging or other bad results due to incorrect boot files.

The disclosed innovations, in various embodiments, provide one or more of at least the following advantages;

- An even greater variety of applications can be based in portable data modules. The benefits of cross-platform compatibility will open many new markets for porting desired functions over to any platform desired by users.
- Even greater security can be assured for portable data modules which are compatible with many platforms, including complex electronic systems which are not configured as personal computers.

A particular advantage of the embodiments which use SD cards is that the SD card spec is defined with a disk-like file structure—so that a PC-bootable module can be achieved easily by adding MBR (master boot record) elements into the SDcard's existing organization.

A further advantage is backward compatibility with existing PC architectures, while allowing many new applications to new architectures. This is particularly useful for applications where users will expect to shuttle their activities between a portable device and a computer.

Another advantage of the disclosed inventions is for easy and secure firmware update in mobile systems, or in devices (such as appliances0 with substantially no permanent storage.

BRIEF DESCRIPTION OF THE DRAWINGS

The disclosed inventions will be described with reference to the accompanying drawings, which show important sample embodiments of the inventions and which are incorporated in the specification hereof by reference, wherein.

DETAILED DESCRIPTION OF THE PREFERRED EMBODIMENTS

The numerous innovative teachings of the present application will be described with particular reference to presently preferred embodiments (by way of example, and not of limitation).

In accordance with a sample embodiment, a removable nonvolatile memory includes a table stored in a predefined memory location in the removable nonvolatile memory, the table identifying a plurality of memory locations within the nonvolatile memory, and a plurality of bootstrap codes associated with a plurality of computer architectures stored in the plurality of memory locations associated with the table.

The predefined memory location is known by a basic input/output system (BIOS) of a computer system coupled to the removable nonvolatile memory and the table includes a plurality of identifiers each unique to the plurality of computer architectures and associated plurality of memory locations. The identifiers can be indexes and the plurality of bootstrap code can comprise two or more of the following architecture types; IA32, Alpha, Arm, Cris, IA64, M64k, Mips, Mips64, Parisc, Ppc, Ppc64, S390, S390x, Sh, Sh64, Sparc, and/or Sparc64. The predefined memory location can be a first logical block address (LBA) and the predefined memory location can be where a master boot record would be located in accordance with a type of architecture of a computer system coupled to the removable nonvolatile memory. The master boot record can be located in one of the plurality of memory locations within the removable nonvolatile memory.

In accordance with another class of embodiments, a method executed on a computer system includes executing a basic input/output system (BIOS) to locate a predefined memory location in a removable nonvolatile memory coupled to the BIOS, the predefined memory location having a table that identifies a plurality of memory locations within the removable nonvolatile memory where a plurality of bootstrap code for a plurality of computer architectures are stored. Executing the BIOS to determine from the table a location of the bootstrap code associated with an identifier associated with a type of architecture of the computer system, and executing the BIOS to load the bootstrap code in to the computer system and execute the bootstrap code.

The table preferably comprises a plurality of identifiers each unique to the plurality of computer architectures and associated plurality of memory locations and the identifiers can be indexes. The BIOS code can be executed to copy the table to the computer system and search the table, while the removable nonvolatile memory can be a SD Memory Card, a Compact Flash, a Hard Drive, or an Optical Disk. As above, the plurality of bootstrap code can include two or more of the following architecture types: IA32, Alpha, Arm, Cris, IA64, M64k, Mips, Mips64, Parisc, Ppc, Ppc64, S390, S390x, Sh, Sh64, Sparc, and/or Sparc64. The predefined memory location can be a first logical block address (LBA) and the predefined memory location can be where a master boot record would be located in accordance with the type of architecture of the computer system. The master boot record can be located in one of the plurality of memory locations within the removable nonvolatile memory.

In accordance with another embodiment, a computer system includes a read only memory (ROM) having a basic input/output system (BIOS) code stored therein, where the BIOS code has knowledge of an identifier associated with a type of architecture of the computer system and knowledge of a predefined memory location having a table that identifies a plurality of memory locations within a removable storage device where a plurality of bootstrap code for a plurality of computer architectures are stored. An interface is coupled to the ROM and a processor coupled to the interface, the processor executes the BIOS code to detect the removable storage device and if detected, locates the predefined memory location, determines from the table a location of bootstrap code associated with the identifier, loads the bootstrap code in to the computer system and executes the bootstrap code.

The table includes a plurality of identifiers each unique to the plurality of computer architectures and associated plurality of memory locations, where the identifiers can be indexes. The processor can execute the BIOS code to copy the table to the computer system and search the table and the removable storage device can be a SD Memory Card, a Compact Flash, a Hard Drive, or an Optical Disk. Like above, the plurality of bootstrap code can include two or more of the following architecture types: IA32, Alpha, Arm, Cris, IA64, M64k, Mips, Mips64, Parisc, Ppc, Ppc64, S390, S390x, Sh, Sh64, Sparc, and/or Sparc64. The predefined memory location can be a first logical block address (LBA) and the predetermined memory location can be where a master boot record would be located in accordance with the type of architecture of the computer system. The master boot record can be located in one of the plurality of memory locations within the removable storage device.

In yet another class of embodiments, a removable nonvolatile memory includes a table stored in a predefined memory location in the removable nonvolatile memory, the table identifying a plurality of memory locations within the nonvolatile memory, and a plurality of applications associated with a plurality of computer architectures stored in the plurality of memory locations associated with the table.

The predefined memory location is known by the computer system coupled to the removable nonvolatile memory and the table includes a plurality of identifiers each unique to the plurality of application associated with the types of computer architectures. The identifiers can be indexes. Like above, the plurality of applications can include two or more of the following architecture types: IA32, Alpha, Arm, Cris, IA64, M64k, Mips, Mips64, Parisc, Ppc, Ppc64, S390, S390x, Sh, Sh64, Sparc, Sparc64, Palm, Windows CE and and/or Windows. The applications can be playback music applications of various types of computer architecture each of which is capable of executing data files stored on the removable nonvolatile memory. For example, music files.

In accordance with an embodiment of the present inventions, a system and method enables a removable storage device to provide appropriate or compatible master boot records and bootstrap programs to bootstrap various computer systems having various types of architectures.

Figure 1A:
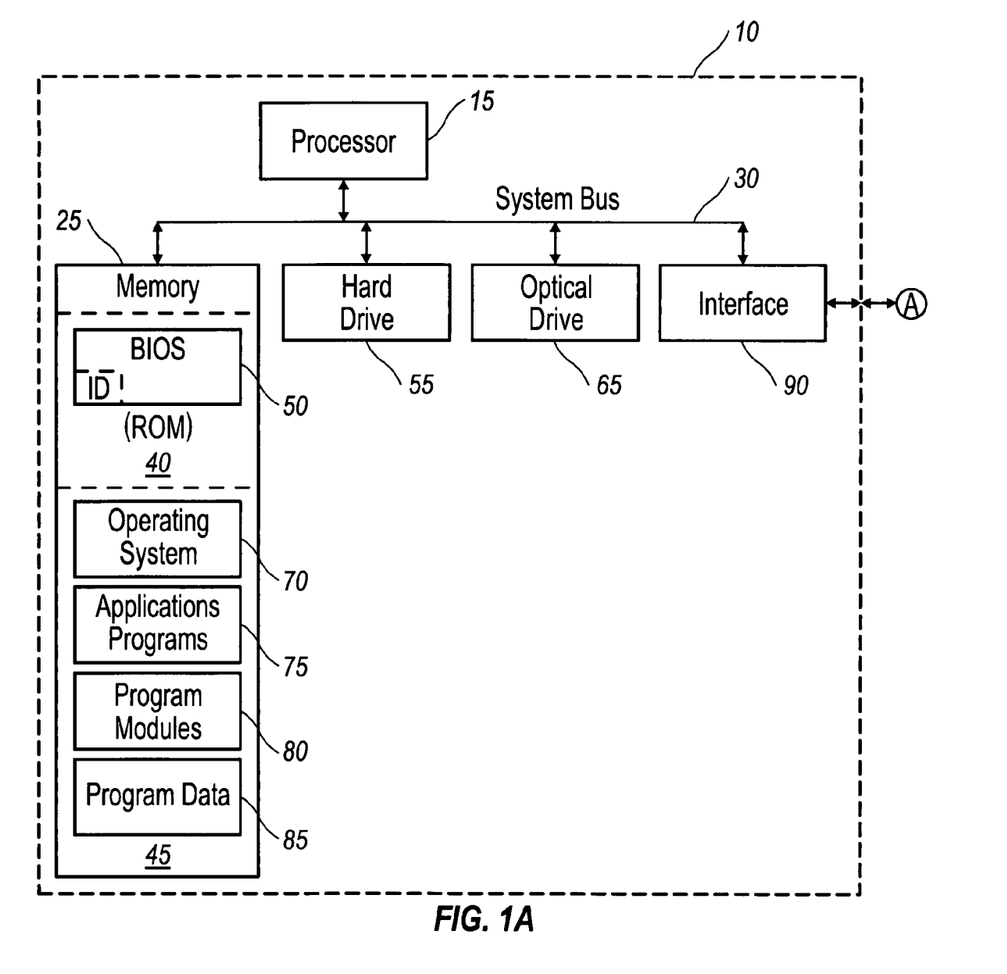
FIG. 1(a) is a block diagram of a computer system.
Figure 1B:
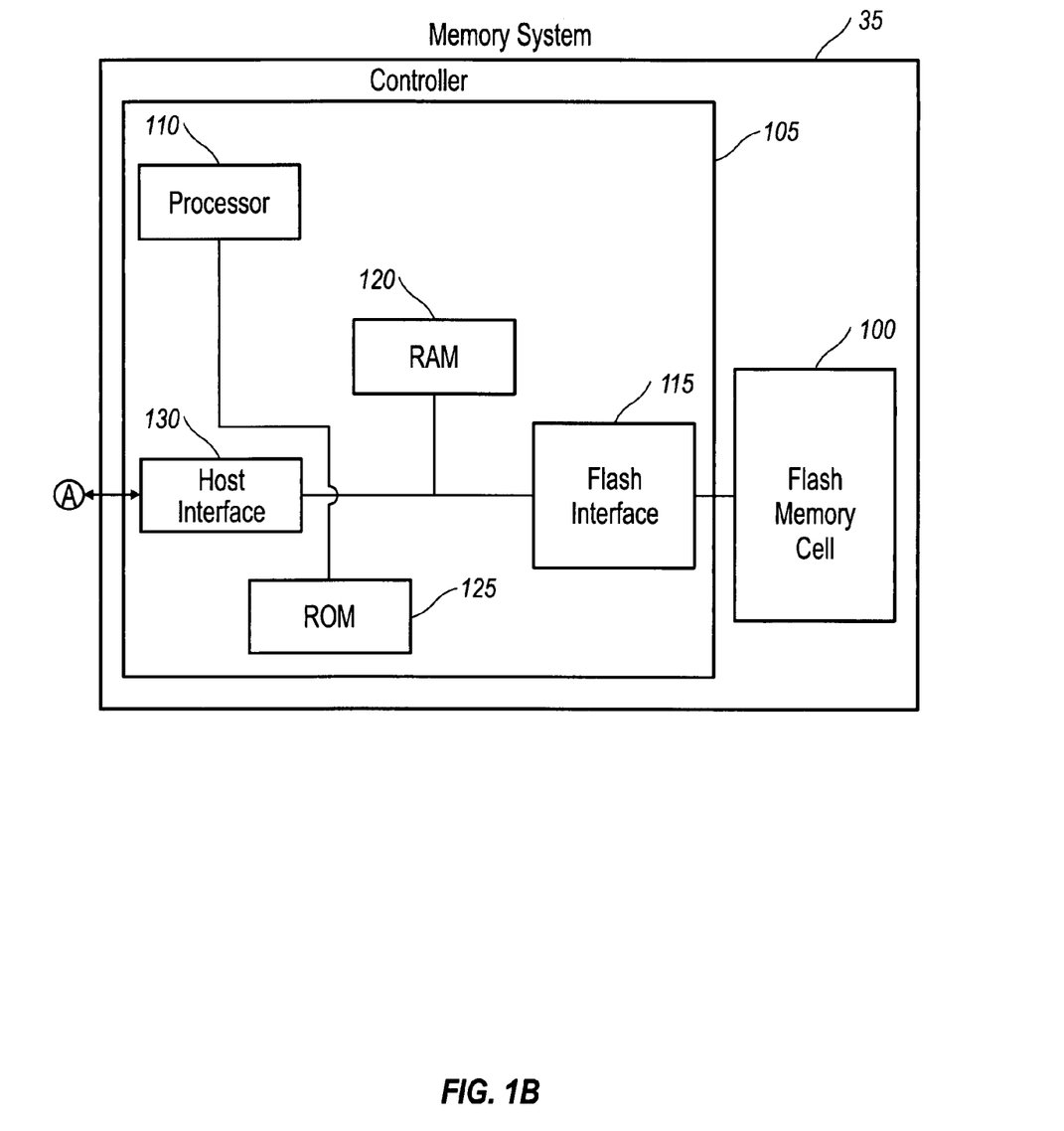
FIG. 1(b) is a block diagram of a removable storage device.

FIGS. 1(a)-(b) are diagrams of a hardware and operating environment in conjunction with which embodiments of the inventions may be practiced. The description of FIG. 1(a) is intended to provide a general description of suitable computer hardware and a suitable computing environment in conjunction with which the inventions may be implemented.

Computer system 10 and removable storage device 35 embody the principles of the inventions where removable storage device 35 provides the appropriate bootstrap code for the particular type of architecture of computer system 10 (e.g. IA32, Intel® architecture) and for various other types of computer architectures, such as Arm®, Alpha® and Sparc®, to name a few. In accordance with the principles of the inventions, the removable storage device 35 can be removed from computer system 10 and operatively coupled to other systems with different architectures, where removable storage device 35 can provide the compatible master boot records and bootstrap programs for the different types of computer architectures. A master boot record includes bootstrap code, which is a boot loader or a program that initiates an operating system kernel. Both are programs, that when executed by a processor, load an operating system into system memory. Example boot loaders are Grand Unified Boot Loader (GRUB) or System Commander. The master boot record and bootstrap program are considered to be boot code.

The exemplary hardware and operating environment of FIG. 1(a) for implementing the inventions includes a programmable device in the form of a computer system 10, including a processor 15, a system memory 25, and a system bus 30 that operatively couples various system components including system memory 25 to processor 15. There may be only one or there may be more than one processor 15, such that the processor of computer system 10 comprises a single central-processing unit (CPU), or a plurality of processing units, commonly referred to as a parallel processing environment. The computer system 10 may be a conventional computer, or any other type of computer; the inventions are not so limited.

The system bus 30 may be any of several types of bus structures including a memory bus or memory controller, a peripheral bus, and a local bus using any of a variety of bus architectures. The system memory 25 may also be referred to as simply the memory, and includes read only memory (ROM) 40 and random access memory (RAM) 45, A basic input/output system (BIOS) program 50 is stored in ROM 40 and contains code comprising basic routines or programs that help to transfer information between elements within the computer system 10, such as during start-up, discussed in detail below. The computer system 10 further includes a hard drive 55 and an optical drive 65, such as a CD ROM or other optical media.

The hard drive 55 and optical drive 65 are connected to the system bus 30 by a hard drive interface and an optical drive interface, respectively. The drives and their associated computer-readable media provide nonvolatile storage of computer-readable instructions, data structures, program modules and other data for computer system 10. It should be realized that any type of computer-readable media which can store data that is accessible by a computer, such as magnetic cassettes, flash memory cards, digital video disks, random access memories (RAMs), read only memories (ROMs), and the like, may be used in the exemplary operating environment. A number of program modules may be stored on the hard drive 55, optical drive 65, ROM 40, or RAM 45, including an operating system 70, one or more application programs 75, other program modules 80, and program data 85.

In an exemplary embodiment of the present inventions, removable storage device 35 is a hard drive conforming to the Logical Block Addressing (LBA) partitioning scheme for PC computers. In accordance with an embodiment of the present inventions, included at sector 1 at offset (0x3E) of removable storage device 35 is a table 45, and at other block locations master boot records 60-1 to 60-y, where y is a number greater than 1. Table 45 identifies various memory locations within removable storage device 35 where various master boot records 60-1 to 60-y compatible with various types of computer architectures (e.g. IA32, Alpha®, Sparc®, to name a few) are located. As mentioned above, in this particular embodiment of the inventions, the architecture type of computer system 10 is the Intel® platform-Windows® operating system. Thus, in order for computer system 10 to be bootstrapped by removable storage device 35, at least one master boot record 60-1 to 60-y stored in removable storage device 35 is compatible with, the Intel®-Windows® architecture. The reaming master boot records are compatible with the types of computer architectures that removable storage device 35 is intended to support.

Figure 2:
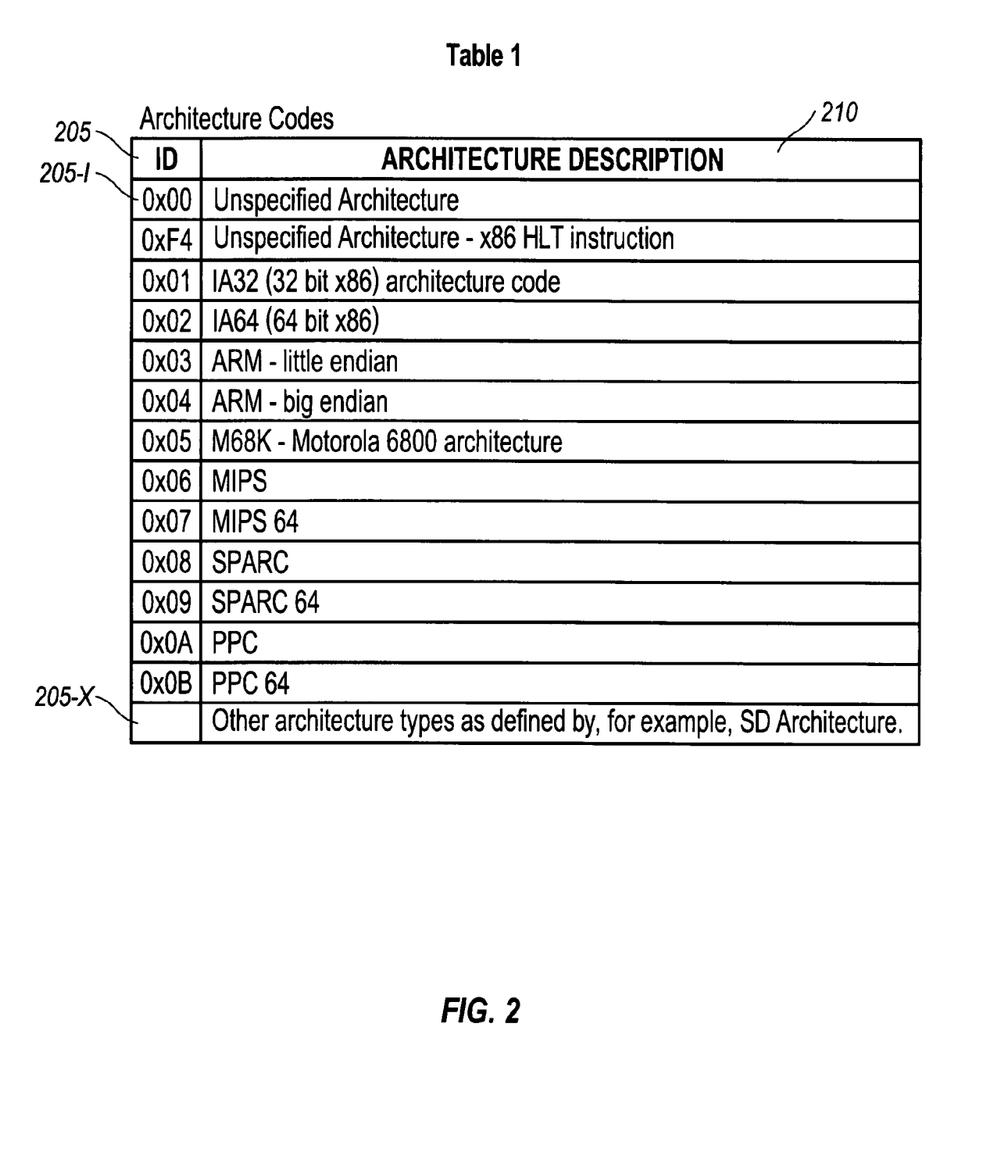
FIG. 2 shows an example of a table for identifying memory locations of master boot records for different types of architectures.
Figure 3:
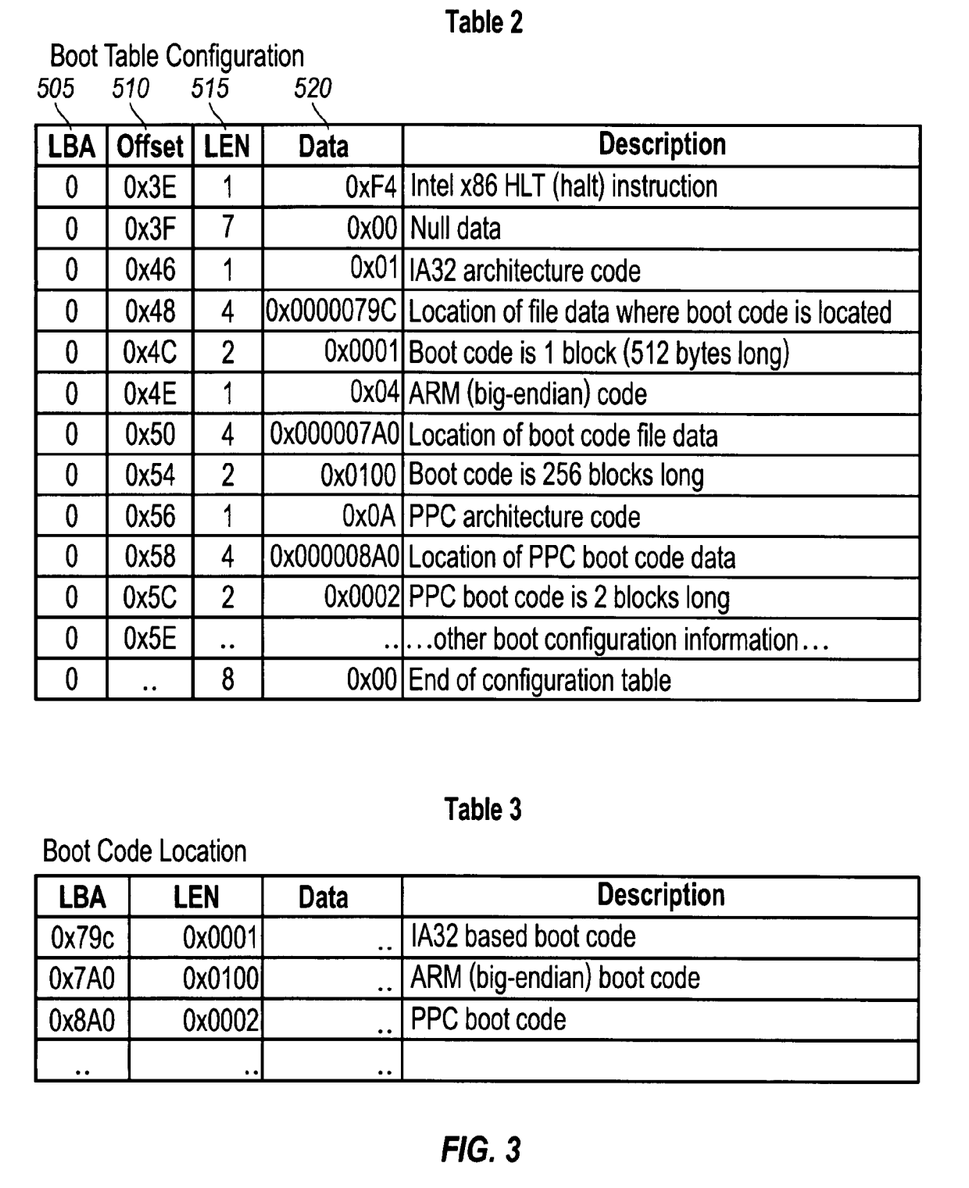
FIG. 3 shows an example of a boot table configuration and an example of a boot code location.

FIG. 2 shows an exemplary table 45 identifying various memory locations within removable storage device 35 where various master boot records compatible with various types of computer architectures are located. The BIOS program 50, stored in ROM 40 of computer system 10, and all other BIOS' stored in computers intended to interface with removable storage device 35, are compatible with table 45. In the present embodiment of the inventions, exemplary table 45 has two columns, an identifier column 205 and an architecture column 210. Identifier column 205 enumerates each identifier (denoted 205-1 to 205-x) for each type of computer system architecture, where x is a number greater than 1. In this particular example, x equals 17, because there are 17 different architectures that removable storage device 35 can support. The identifiers function as indexes and consist of unique 8 byte entries that represents unique locations in identifier column 205. FIG. 3 shows an example of a boot table configuration and an example of a boot code location.

Each type of computer system architecture is assigned a unique identifier that identifies the type of computer system, architecture. This identifier is stored, equipped or "burned" into the ROM of each computer system intending to interface with a removable storage device designed in accordance with the inventions. The identifier is operable with the BIOS program of the computer system of which it resides. It is also used to identify the type of architecture of its computer system.

In this embodiment of the present inventions, an exemplary identifier "8686" is assigned to the Intel®-Windows® architecture. Identifier "8686" is "burned" into ROM 40 and made part of the BIOS. It should be realized that all other computer systems having the Intel®-Windows® architecture will have the same identifier "8686" "burned" into their ROMs. Of course, a computer system with a different type of architecture, such as Alpha®, will have a different identifier, for example "2218," "burned" into its ROM. As mentioned above, the identifier represents a particular type of computer architecture or platform. Thus, the type of architecture of the computer system can be determined from reading the identifier. Each identifier is also associated with a corresponding entry in an architecture column 210 of table 45.

The table (45) includes architecture column 210, which enumerates the memory locations (denoted 210-1 to 210-x) for the master boot records for the various computer architectures that removable storage device 35 supports. As mentioned above, x equals 17. It should be realized that although there is one identifier for each of the 17 different architectures, removable storage device 35 does not have to store nor make available 17 master boot records. Thus, table 45 may indicate an identifier "7999" assigned to Arm® architecture, but it may be desired that removable storage device 35 not have the compatible master boot record stored within, for example to save memory space, which is discussed in more detail later.

The memory location entries in architecture column. 210-1 to 210-17 are block addresses indicating where master boot records for the various types of architectures are located in removable storage device 35. Every entry in architecture column 210 is 6 bytes where the first four bytes specify a Logical Block Address (LBA) offset. The LBA offset indicates where the master boot record for a specific architecture resides in removable storage device 35. The other 2 bytes specify the length of the binary as a number of LBA sectors. Removable storage device 35 utilizes the Logical Block Address scheme, which among other things, includes translating logical block address locations to physical block, addresses locations on the removable storage device.

To summarize, identifiers (denoted 205-1 to 205-17) are associated with memory locations (denoted 210-1 to 210-17) where master boot records and bootstrap programs are stored. Thus, if an identifier of a particular type of computer architecture is known, table 45 can be used to locate a compatible or corresponding master boot record and bootstrap program (e.g. boot loader) stored in removable storage device 35.

As mentioned above, although in table 45 there is one identifier for each of the 17 different architectures, removable storage device 35 does not have to store nor make available 17 master boot records. In situations where it is desired to not include a master boot record for a particular type of architecture, a NULL or "0" values are used to specify an empty entry in architecture column 210 corresponding to the identifier of the type of architecture that is not supported. For example, if it is desired that removable storage device 35 not support Cris® architecture, then its identifier "7853" would be associated with a NULL or "0" values in architecture column 210, rather than with a memory location. Further, removable storage device 35 would not store the compatible master boot record for the Cris® architecture, thus saving memory space. Referring to table 45, Cris® architecture memory location (denoted 210-3) would have a "0000" entry. The first entry in table 45 is an index "0" (denoted 220) which has a corresponding value x86 HLT (0xF4) (denoted 215). The x86 HLT (0xF4) opcode is a halt instruction that prevents older Intel® architectures from erroneously executing any master boot records in removable storage device 35.

Figure 4:
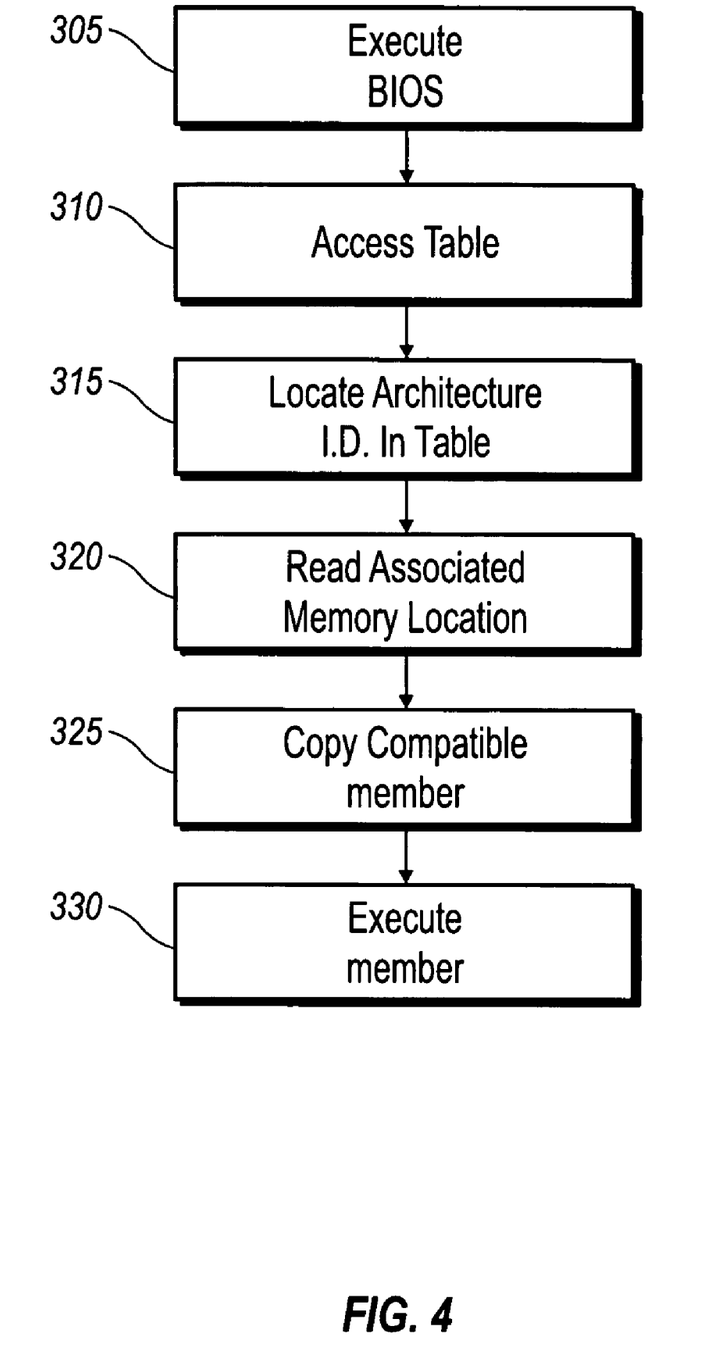
FIG. 4 is a flowchart illustrating a process for bootstrapping a computer system from a removable device capable of bootstrapping computer systems with different architectures.

FIG. 4 shows a flowchart of a method performed by computer system 10 and removable storage device 35, according to an exemplary embodiment. When computer system 10 is turned on, processor 15 goes to a memory location in ROM 40 and begins to execute BIOS program 50 (block 305). As with any Intel®-Windows® architecture, BIOS program 50 conducts a power-on self-test (POST) and a search for a master boot record. BIOS program 50 has an understanding of the devices connected to and part of computer system 10, for example optical drive 65, hard drive 55, and a Universal Serial Bus operatively coupled to interface 90. Thus, BIOS program 50 is able to interact with and detect the devices. For example, interact with and detect removable storage device 35.

In prior art systems, having identified the drive where the master boot record is located, a BIOS program looks at the sector 1 (a 512-byte area), LBA #0 of a device where the master boot record is stored and at offset 0x3E (448 byte area) where bootstrap code is stored. The BIOS program copies the master boot record into RAM and passes control to the master boot record. The master boot record takes control of its computer system and loads code until it is no longer needed.

In accordance with an embodiment of the present inventions, table 45 is stored in sector 1 of removable storage device 35, rather than, the master boot record. The master boot record and bootstrap code are relocated to one of the memory locations 60-1 to 60-y in removable device 35 in accordance with table 45, where y equals the number of master boot records stored in removable storage device 35. Also in accordance with the embodiment of the present inventions, the master boot record and bootstrap code are stored among other master boot records and bootstrap codes, each of which are compatible with different types of computer system architectures. Referring to FIG. 2, the memory location of the master boot: record and bootstrap code for an Intel®-Windows® architecture is XXX (denoted by 210-4).

Thus, BIOS program 50 reads table 45 located at sector 1 and uses the identifier "burned" into ROM 40 to find the location of the master boot record and bootstrap code compatible with the architecture of computer system 10. Further, BIOS program 50 is configured to select information and implement options from table 45. Alternatively, information and options in table 45 can be selected and implemented via a program, stored in ROM 40 working with BIOS program 50.

Referring back to FIG. 4, processor 15 continues to execute BIOS program 50, which identifies removable storage drive 35 and accesses table 45 located at a predefined memory location (block 310). In this example, the predefined memory location is sector 1 (a 512-byte area) and more specifically offset 0x3E (a 448 byte area) of removable storage device 35. Having knowledge of the identifier for computer system 10, BIOS program 50 locates identifier "8686" (denoted 205-4) in table 45 (block 315). As mentioned above, in accordance with the present embodiment of the inventions, the identifier functions as an index. Thus, allowing BIOS program 50 to find its specific location in table 45 without having to iterate through the table. As mentioned above, in this example, computer system 10 is based on the Intel®-Windows® architecture, which was assigned an "8686" identifier.

Subsequently, BIOS program 50 reads the memory location entry in architecture column 210 associated with identifier "8686" (block 320). In this example, the entry in architecture column 210 associated with identifier "8686" is XXXX (denoted 210-4), which specifies the memory location where the compatible master boot record is located in removable storage device 35. Following the LBA scheme, removable storage device 35 translates the logical block address to a physical block, address, which indicates where on the media the compatible master boot record is located. BIOS program 50 accesses the memory location at LBA offset xxx and copies the master boot record to RAM 45 (block 325). Computer system 10 executes the master boot record and passes control to the master boot record (block 330). The master boot record takes control of computer system 10 and continues to loads code until it is no longer needed, which includes loading the computer system's operating system from hard drive 55 into RAM 45.

As mentioned above, in accordance with, the embodiment of the present inventions, removable storage device 35 can be disconnected from computer system 10, operatively connected to a second computer system with a different architecture and bootstrap the second computer system.

Figure 5:
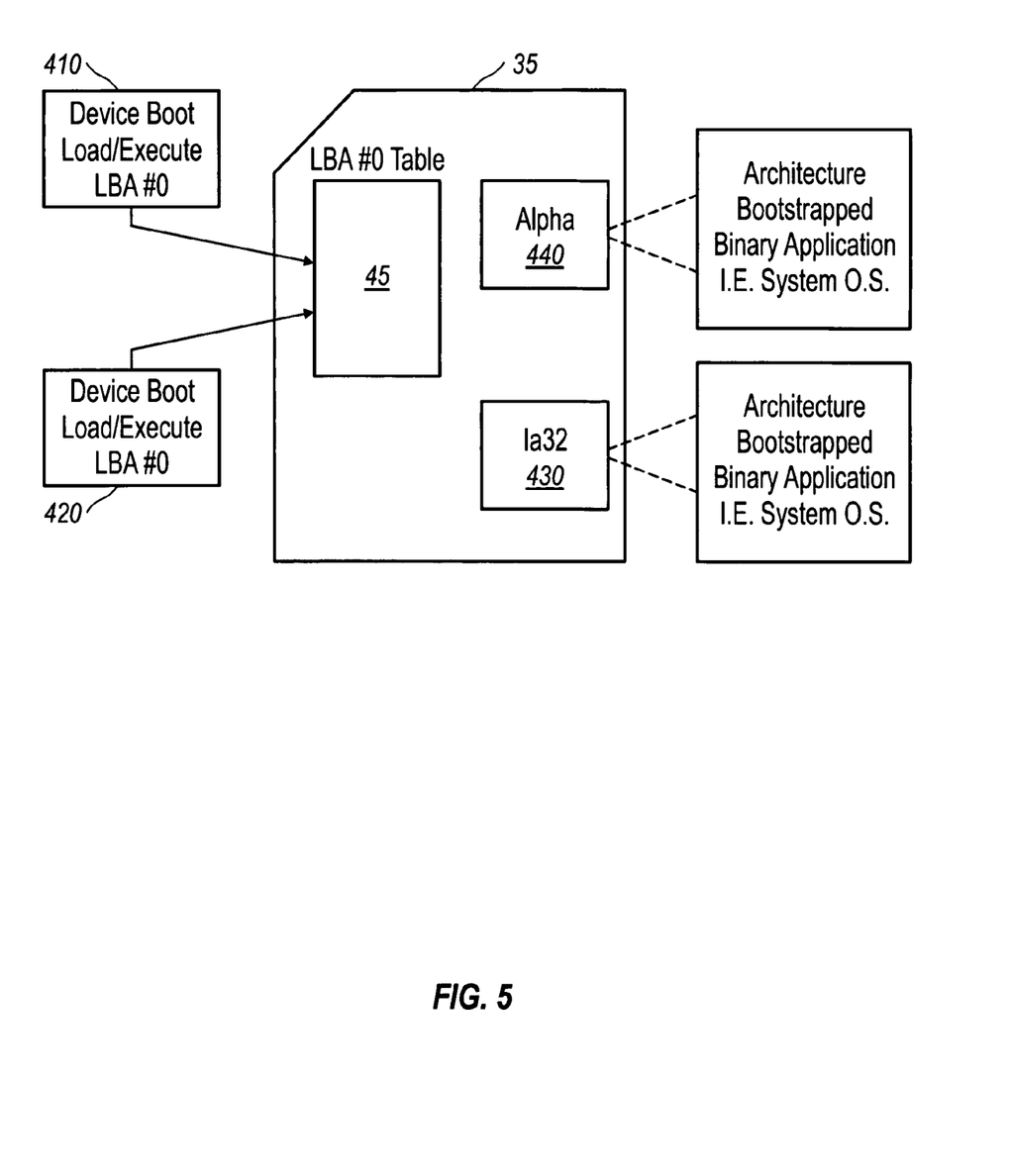
FIG. 5 shows a general exemplary block diagram of a removable storage device which includes a sample embodiment.

For example, FIG. 5 shows a general exemplary block diagram of removable storage device 35 in accordance with the method and system described above. In a first exemplary embodiment, removable storage device 35 is operatively coupled to computer system 410 which includes the Intel® architecture. When computer system 410 is turned on, its BIOS program accesses its identifier in table 45. From table 45, the BIOS program determines the location of its master boot record 430, copies the master boot record and stores it in RAM in computer system 410, where it is executed.

In a second exemplary embodiment, removable storage device 35 is operatively coupled to computer system 420 which includes the Alpha® architecture. When computer system 420 is turned on, its BIOS program accesses its identifier in table 45. From table 45, the BIOS program determines the location of its master boot record 440, copies the master boot record and stores it in RAM in computer system 420, where it is executed.

The foregoing merely illustrates the principles of the inventions. It will thus be appreciated that those skilled in the art will be able to devise numerous other arrangements which embody the principles of the inventions and are thus within its sprit and scope.

For example, based on the above disclosure, it is apparent that the removable storage device can be memory, such as a SD Memory Card, Compact Flash Card, MuitiMedia Card or other removable card or memory device and readily accommodate the principles of the inventions.

In addition, based on the disclosure, it is apparent that the principles of the inventions can readily accommodate a table that is loaded into RAM 45 of computer system 10. In this exemplary embodiment of the present inventions, the BIOS program in ROM 40 locates table 45 stored in removable storage device 35 and loads table 45 into RAM 45. The BIOS program iterates through the table searching for an identifier matching the identifier stored in ROM 40. Like in the above exemplary embodiments, the identifiers represent the various types of computer architectures, but in this example the identifiers simply identify the different types of architectures, not function as indexes. Thus, the BIOS program has to iterate through table 45 searching for the appropriate identifier, rather than going specifically to the appropriate identifier in table 45, as in the case with the identifier that functions as an index.

After the identifier is located in table 45, the BIOS program reads the memory location associated with the identifier and accesses the appropriate master boot record located in removable storage device 35. The BIOS program copies the master boot record from removable storage device 35 and loads it into RAM 45 where processor 15 executes the master boot record.

In this embodiment of the present inventions, there are no empty entries (e.g. NULL or "0" values) in the architecture column of the table because the identifiers in this embodiment do not function as indexes. The table only stores identifiers that have master boot records stored in removable device 35, resulting in no empty entries in the table and a smaller table. For example, if there is no intention, to use removable storage device 35 with a computer system having the Arm architecture, then not only is there no Arm® compatible master boot record stored in removable storage device 35, there is no Arm® identifier or memory location in the table. Of course, because the identifier is not acting as an index, the BIOS program iterates through each identifier in the table to locate the identifier for the correct architecture.

In another embodiment of the present inventions, a computer system is running and an operating system is already loaded. In this embodiment of the present inventions, multiple applications are stored on a removable storage device (e.g. SD Card). For example, 3 playback music applications are stored on the removable storage device, each one compatible with a different computer architecture. When the removable storage device is operatively coupled to a computer system, the removable storage device is recognized. An auto-run program, having knowledge of the identifier of the computer system and the table in the removable storage device, locates the memory location where the playback music application associated with the identifier is located. Subsequently, the auto-run program loads the compatible playback music application on the computer system, where the application can play the content (data files, music files) stored on the removable storage device. Example computer system architectures are Palm®, Windows CE® and Windows®.

Further, the system is disclosed in a form in which various functions are performed by discrete functional blocks. However, any one or more of these functions could equally be embodied in an arrangement in which the functions of any one or more of those blocks are realized by one or more appropriately programmed processing devices running software programs stored in various mediums or having functions programmed in firmware.

Moreover, those skilled in the art will appreciate that the inventions may be practiced with other computer system configurations, including hand-held devices, multiprocessor systems, microprocessor-based or programmable consumer electronics, network PCs, minicomputers, mainframe computers, and the like.

Finally, the inventions may also be embodied in a configured computer program storage medium (e.g., CD-ROM, hard disk, RAM) which contains software to perform methods.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

The system which boots from the portable module does not have to be a computer in the strict sense of the word, but can also be a game machine, PDA, or other complex system capable of executing programs.

The portable module does not have to be an SD or MS memory unit, but can conform to any of a wide range of physical and electronic specifications for removable memory, including specifications which do not yet exist.

The various operating systems and hardware architectures mentioned above are merely examples—the disclosed inventions are applicable to a very wide range of contexts, including once which may appear in the future.

The table format and coding does not have to be that described in the foregoing embodiments, but can of course be widely varied, as will be well understood by those of ordinary skill.

The table location too does not have to be that described in the foregoing embodiments. In one optional alternative, a different version of the table is included at a different location, in addition to or instead of the table location described above.

It is also possible that booting from the portable module may be manually assisted. For example, a compact unit may allow a user interaction to set up a state which forces the loader program to allow booting from the location specified in the data table in an attached portable module, even though the normal boot sequence would not branch to the portable module.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A removable memory system configured to interface with a host system in order to boot only a single architecture type for the host system, the memory system comprising:
    a memory containing:
        boot codes for at least two mutually incompatible computer system architecture types, and
        a data structure which correlates the incompatible architecture types with memory locations of said boot codes; and
    an interface in communication with the memory, the interface for removably interfacing with the host system and configured to:
        receive a first request from the host system, the first request for the host system to access the data structure in order to identify a boot code memory location based on the single architecture type of the host system, and
        receive a second request from the host system to load the boot code for the architecture type from the boot code memory location, the second request in order to commence booting of the host system.

2. The memory system of claim 1, wherein said memory contains boot codes for at least four mutually incompatible computer system architecture types.

3. The memory system of claim 1, wherein said data structure is a table.

4. The memory system of claim 1 further comprising a cryptographic engine, and memory space which is accessible only through said cryptographic engine.

5. The memory system of claim 1, wherein said memory contains boot files for ARM and PPC architectures, in addition to boot files for at least one desktop computer architecture.

6. The memory system of claim 1, wherein said data structure is stored at a predetermined location in said memory.

7. The memory system of claim 1, wherein said computer system includes telephone functionality.

8. The memory system of claim 1, wherein the host system consists of a single architecture type.

9. The memory system of claim 1, wherein the data structure further correlates at least one architecture type with an indicator indicating that the memory system does not support booting the at least one architecture type.

10. A computer system comprising:
    a stored identifier that identifies a type of architecture of the computer system;
    a read only memory (ROM) having a basic input/output system (BIOS) code stored therein, where the BIOS code has knowledge of the identifier and knowledge of a predefined memory location having a table that identifies a plurality of memory locations within a removable storage device where a plurality of bootstrap code for a plurality of computer architectures are stored;
    an external interface configured to interface with the removable storage device; and
    a processor, in communication with the ROM and the external interface, that executes the BIOS code, detects the removable storage device and if detected, locates the predefined memory location in the removable storage device, uses the identifier to determine from the table a location of bootstrap code compatible with the type of architecture of the computer system, loads the bootstrap code into the computer system and executes the bootstrap code in order to commence booting of the computer system.

11. The computer system of claim 10 wherein the table comprises a plurality of identifiers each unique to the plurality of computer architectures and associated plurality of memory locations.

12. The computer system of claim 10 wherein the identifiers are indexes.

13. The computer system of claim 10 wherein the processor executes the BIOS code to copy the table to the computer system and search the table.

14. The computer system of claim 10 wherein the removable storage device is a SD Memory Card, a Compact Flash, a Hard Drive, or an Optical Disk.

15. The system of claim 10 wherein the plurality of bootstrap code comprise two or more of the following architecture types: IA32, Alpha, Arm, Cris, IA64, M64k, Mips, Mips64, Parisc, Ppc, Ppc64, S390, S390x, Sh, Sh64, Sparc, and/or Sparc64.

16. The computer system of claim 10 wherein the predefined memory location is a first logical block address (LBA).

17. The computer system of claim 10 wherein the predetermined memory location is where a master boot record would be located in accordance with the type of architecture of the computer system.

18. The computer system of claim 17 wherein the master boot record is located in one of the plurality of memory locations within the removable storage device.

19. The computer system of claim 10 wherein the computer system consists of a single type of architecture.

20. A method for a host computer system to boot using a removable memory system interfacing with the host system, the method comprising:

powering up the host computer system using an initial instruction sequence stored in a host computer system;

detecting the removable storage device, the removable storage device interfacing with the host computer system via an external interface;

reading an identifier stored in the host computer system, the identifier identifying a type of architecture of the host computer system;

locating a predefined memory location in the removable storage device, the predefined memory having a table that identifies a plurality of memory locations in the removable storage device where a plurality of bootstrap code for a plurality of computer architectures are stored;

using the identifier to determine from the table a location in the removable storage device of bootstrap code compatible with the type of architecture of the host computer system;

loading the bootstrap code into the host computer system; and     executing the bootstrap code in order to commence booting of the host computer system.

21. The method of claim 20, wherein locating the predefined memory location in the removable storage device comprises copying the table from the removable storage device into the host computer system.

22. The method of claim 21, wherein the host computer system consists of a single architecture type.

23. The method of claim 21, further comprising using the identifier to determine that the removable storage device does not support booting the type of architecture of the host computer system.

24. The method of claim 23, wherein the table correlates the type of architecture of the host computer system with an indicator indicating that the removable storage device does not support booting the type of architecture of the host computer system.

* * * * *